United States Patent
Tang et al.

(10) Patent No.: US 11,171,494 B2
(45) Date of Patent: Nov. 9, 2021

(54) BALANCING A MULTI-CELL BATTERY

(71) Applicant: CORVUS ENERGY INC., Richmond (CA)

(72) Inventors: Siu Lun Isaac Tang, Richmond (CA); David Maurice Lokhorst, Richmond (CA)

( * ) Notice: Subject to any disclaimer, the term of this patent is extended or adjusted under 35 U.S.C. 154(b) by 20 days.

(21) Appl. No.: 16/348,078

(22) PCT Filed: Nov. 7, 2017

(86) PCT No.: PCT/CA2017/051323
§ 371 (c)(1),
(2) Date: May 7, 2019

(87) PCT Pub. No.: WO2018/081912
PCT Pub. Date: May 11, 2018

(65) Prior Publication Data
US 2019/0280488 A1   Sep. 12, 2019

Related U.S. Application Data

(60) Provisional application No. 62/418,728, filed on Nov. 7, 2016.

(51) Int. Cl.
H02J 7/00 (2006.01)
H01M 10/42 (2006.01)
(Continued)

(52) U.S. Cl.
CPC ......... *H02J 7/0014* (2013.01); *H01M 10/425* (2013.01); *H01M 10/441* (2013.01);
(Continued)

(58) Field of Classification Search
CPC ...... H02J 7/0014; H02J 7/0016; H02J 7/0048; H02J 7/0047; H02J 7/14; H01M 10/48;
(Continued)

(56) References Cited

U.S. PATENT DOCUMENTS 6,114,835 A  *  9/2000  Price ................... H02J 7/0018
                                                         320/118
6,624,612 B1 *  9/2003  Lundquist ......... H01M 10/4207
                                                         320/118
(Continued)

FOREIGN PATENT DOCUMENTS

DE         10134147 A1    2/2003
DE     102012011604 A1   12/2013
(Continued)

OTHER PUBLICATIONS

Extended European Search Report for EP Application No. 17866560.0 dated Mar. 31, 2020.
(Continued)

*Primary Examiner* — M Baye Diao
(74) *Attorney, Agent, or Firm* — Venable LLP; Michele V. Frank

(57) ABSTRACT

There is described a method of balancing a multi-cell battery. An alignment distance for each cell of the multi-cell battery is determined. The alignment distance defines a change in charge quantity required to achieve a target alignment point, based on a current charge quantity of the cell. Based on the determined alignment distances, one or more unbalanced cells are identified. Each unbalanced cell is then balanced by adjusting its current charge quantity according to the alignment distances. In one embodiment, the target alignment point is a target state of charge. In another embodiment, the target alignment point is a target charge quantity.

18 Claims, 6 Drawing Sheets

(51) Int. Cl.
*H01M 10/44* (2006.01)
*H01M 10/48* (2006.01)

(52) U.S. Cl.
CPC ......... *H01M 10/48* (2013.01); *H01M 10/482* (2013.01); *H02J 7/0016* (2013.01); *H01M 2010/4271* (2013.01); *H02J 7/0048* (2020.01)

(58) Field of Classification Search
CPC ............ H01M 10/441; H01M 10/482; H01M 2010/4271; Y02E 60/10; Y02T 10/70; B60L 58/22; B60L 58/13; B60L 58/16
USPC ........................................................ 320/128
See application file for complete search history.

(56) References Cited

U.S. PATENT DOCUMENTS

| | | | | |
|---|---|---|---|---|
| 7,525,285 | B2 * | 4/2009 | Plett | H02J 7/0014 320/132 |
| 7,863,863 | B2 * | 1/2011 | Chan | H02J 7/0016 320/122 |
| 8,058,844 | B2 * | 11/2011 | Altemose | H01M 10/441 320/118 |
| 8,120,321 | B2 * | 2/2012 | Vezzini | H02J 7/0014 320/118 |
| 8,143,852 | B2 * | 3/2012 | Murao | H02J 7/0016 320/118 |
| 8,598,847 | B2 * | 12/2013 | Eberhard | H02J 7/0016 320/126 |
| 8,854,008 | B2 * | 10/2014 | Liu | B60L 58/22 320/134 |
| 8,901,886 | B2 * | 12/2014 | Berkowitz | H02J 7/0071 320/118 |
| 9,362,772 | B2 * | 6/2016 | Hua | H02J 7/0068 |
| 9,379,416 | B2 * | 6/2016 | Schaefer | H01M 10/441 |
| 9,685,797 | B2 * | 6/2017 | Tofigh | H02J 7/0018 |
| 10,283,973 | B2 * | 5/2019 | Curtis | H02J 7/0018 |
| 10,422,834 | B2 * | 9/2019 | Tang | G01R 31/3842 |
| 10,547,184 | B2 * | 1/2020 | Carralero | H02J 7/0014 |
| 10,804,690 | B2 * | 10/2020 | Ronne | H02H 1/0092 |
| 2006/0022639 | A1 | 2/2006 | Moore | |
| 2009/0027006 | A1 | 1/2009 | Vezzini et al. | |
| 2010/0171503 | A1 | 7/2010 | Fredette et al. | |
| 2012/0086401 | A1 * | 4/2012 | Laber | H02J 7/0016 320/118 |
| 2013/0043840 | A1 * | 2/2013 | Bylsma | H02J 7/0016 320/118 |
| 2013/0147434 | A1 | 6/2013 | Boehm et al. | |
| 2013/0328529 | A1 * | 12/2013 | Zbrozek | H02J 7/0016 320/118 |
| 2014/0049224 | A1 * | 2/2014 | Hua | H02J 7/0016 320/136 |
| 2017/0294788 | A1 * | 10/2017 | Curtis | H02J 7/0072 |

FOREIGN PATENT DOCUMENTS

| | | |
|---|---|---|
| DE | 102013108198 A1 | 4/2014 |
| DE | 102013203174 A1 | 8/2014 |
| JP | 2003-087987 A | 3/2003 |
| JP | 2003-333762 A | 11/2003 |
| JP | 2009-081981 A | 4/2009 |
| JP | 2009-113702 A | 5/2009 |
| JP | 2013-027110 A | 2/2013 |
| JP | 2014-023354 A | 2/2014 |
| JP | 2014155401 A1 | 8/2014 |
| JP | 2016-024162 A | 2/2016 |

OTHER PUBLICATIONS

Written Opinion for PCT/CA2017/051323 dated Jan. 19, 2018.
International Search Report for PCT/CA2017/051323 dated Jan. 19, 2018.
Notice of Reasons for Rejection dated Sep. 13, 2021, directed to JP Application No. 2019-523539; 24 pages.

* cited by examiner

BALANCING A MULTI-CELL BATTERY

This application is a National Stage Entry of PCT/CA2017/051323, filed Nov. 7, 2017, which claims priority to U.S. Provisional Application No. 62/418,728, filed on Nov. 7, 2016, the entire contents of each of which are hereby incorporated by reference in their entireties.

FIELD OF THE DISCLOSURE

The present disclosure relates to a method of balancing a multi-cell battery, such as a rechargeable lithium-ion battery as used in the maritime industry.

Background to the Disclosure

One type of rechargeable battery is a lithium-ion battery, comprising a number of serially connected cells. The battery is typically housed in an enclosure to form a battery module. During normal operating conditions, electrical energy is converted to and stored as chemical energy during charging, and stored chemical energy is converted to electrical energy during discharging.

The cells within the module differ slightly in capacity and other parameters due to acceptable manufacturing tolerances. During use, and especially after repeated charging and discharging of the battery (i.e. after repeated charging-discharging cycles), the slight differences in the cells will gradually cause the cells to settle at voltages that differ from each other. Since the cells are arranged in series, this will result in lower effective capacity, as charging must be stopped when the cell with the highest voltage reaches its upper voltage limit, and discharging must be stopped when the cell with the lowest voltage reaches its lower voltage limit. To overcome this restriction in effective capacity, it is well known that lithium-ion cells can be "balanced" from time to time. This is typically implemented by means of a balancing circuit that is permanently mounted within the module. To balance the cells of a battery, the charge contained in those cells with a relatively higher open circuit voltage is dissipated until all cells have an open circuit voltage that is roughly equal, or "balanced".

Open circuit voltage, or OCV, is the voltage at which the cell settles after a period of rest (i.e. when no current is flowing or the cell is not part of an electrical circuit). It typically takes 10-30 minutes of rest for a lithium-ion cell to asymptotically reach OCV. Some batteries are designed with cells in a series-parallel arrangement. For example, a battery module may have 24 battery cells, arranged as 12 groups, each of the groups consisting of 2 cells in parallel. Such a group of cells connected in parallel is called a "series element". The cells within a series element will generally have equal voltage due to the fact they are directly connected in parallel. The voltage of a series element (i.e. the voltage of all of the cells within the series element) is called the "series element voltage", or SEV. The series elements will differ in voltage for the same reasons that single cells in series differ in voltage. Therefore, both series only and series-parallel arrangements of batteries will require balancing. In the parlance of the industry, a series element may have 1, 2, 3, or more cells.

In industries where sustained electrical power output is important, such as the maritime industry, it is key that the batteries be operated with as little interruption as possible. In particular, battery packs (comprising multiple battery modules connected in series) on a vessel such as a ship are often run around the clock in order to power the ship's various functions. One particular issue with the operation of such batteries is the requirement to take a battery module (or indeed an entire battery pack) offline in order to balance the cells. This is because, when balancing the cells, it is usual for the voltage of each cell to be continuously measured so that the balancing can be monitored and stopped when the desired voltage is reached. However, measuring the voltage of a cell while the battery is running (i.e. is being discharged) can lead to misleading voltage readings since, when electrical current is applied to the cell, its SEV deviates from its OCV due to internal resistance of the cell. Furthermore, the internal resistance differs among cells due to acceptable manufacturing tolerances and age effects. Therefore, the relative SEVs while charging and discharging differ from the relative OCVs of those cells. Thus, is it usual when balancing the cells for the battery to be taken offline such that it is no longer providing a power output. Balancing can be a relatively slow process, and as a result the corresponding offline time can in some cases be significant (in some cases upwards of one day), which is clearly undesirable.

There is therefore a need in the art for new and improved methods of balancing battery cells, directed at addressing at least some of the current drawbacks in prior art balancing systems.

SUMMARY OF THE DISCLOSURE

In a first aspect of the disclosure, there is provided a method of balancing a multi-cell battery. The method comprises, for each cell, determining an alignment distance defining a change in charge quantity required to achieve a target alignment point, based on a current charge quantity of the cell. The method further comprises identifying one or more unbalanced cells, based on the determined alignment distances. The method further comprises balancing each unbalanced cell by adjusting the current charge quantity of each unbalanced cell in accordance with the determined alignment distances.

Charge quantity may be defined as an amount of charge contained within the cell.

The target alignment point may comprise a predetermined target state of charge. The target alignment point may comprise a target charge quantity. Determining an alignment distance for each cell may be further based on a charge capacity of the cell.

Advantageously, balancing the cells about a user-determined alignment point, the need to balance to cells of the battery may be reduced, despite differences in effective capacity between the cells.

In an embodiment where the alignment point comprises a predetermined target state of charge, balancing each unbalanced cell by adjusting the current charge quantity of each unbalanced cell may comprise bringing the alignment distances towards one another. Bringing the alignment distances towards one another may comprise reducing the differences between the alignment distances, by varying the current charge quantity in each unbalanced cell. In particular, by varying the current charge quantity in each unbalanced cell, the alignment distances may be varied so as to approach a common value or a predetermined range.

In an embodiment where the alignment point comprises a target charge quantity, balancing each unbalanced cell by adjusting the current charge quantity of each unbalanced cell may comprise minimising the alignment distances such that they approach zero or are brought within a configurable range of zero.

Thus, whereas prior art cell balancing focuses on equating cell voltages in order to equate the states of charge of the cells, embodiments of the disclosure seek to equate the amount of charge required to being each cell to a common, target alignment point. As a result, state of charge/charge quantity variance between the cells may be minimised about the target alignment point.

The target alignment point may be comprised within an operating range of the multi-cell battery. The operating range may comprise a range of charge quantities or states of charge within which, in use, each cell of the multi-cell battery is operated. Thus, the target alignment point may be selected so as to be within a particular operating range of the cells. The target state of charge may be within the middle of, or close to the middle of, the operating range. This may maximise the time spent by the cell at the target alignment point. The overall life of the multi-cell battery may be maximised by cycling near the centre of the range of states of charge/charge quantities, as opposed to the extremities.

The operating range may be bounded by a maximum state of charge at which a first cell has a charge quantity equal to a charge quantity of a second cell at a state of charge of 100%. The first cell, when at a state of charge of 100%, may have the greatest charge quantity from among the cells of the multi-cell battery. The second cell, when at a state of charge of 100%, may have the least charge quantity from among the cells of the multi-cell battery. Thus, the operating range of the multi-cell battery may comprise the overlap in charge quantity between the cells.

Balancing each unbalanced cell may comprise adjusting the current charge quantity of each unbalanced cell such that the alignment distances of the cells of the multi-cell battery are brought within a predetermined range of an alignment distance setpoint. The alignment distance setpoint may comprise a function of one or more of the determined alignment distances. The alignment distance setpoint may comprise AhDifference or AhConvergencePoint, as described in more detail below.

The alignment distance setpoint may comprise an average of the determined alignment distances. This may be the case if the multi-cell battery is configured to balance the cells by both charging and draining the cells of charge. The alignment distance setpoint may comprise an average of a preset number of the lowest determined alignment distances. This may be the case if the multi-cell battery is only configured to balance the cells by draining the cells of charge. The alignment distance setpoint may be equal to the lowest determined alignment distances.

Balancing an unbalanced cell may comprise adjusting the current charge quantity of the unbalanced cell by an amount AhOutOfBalance=absolute value (alignment distance setpoint−alignment distance). This may correspond to an embodiment where the alignment point is a target state of charge.

In an embodiment where the alignment point comprises a target charge quantity, balancing each unbalanced cell may comprise adjusting the current charge quantity of each unbalanced cell such that the alignment distances of the cells of the multi-cell battery are brought within a predetermined range of the target charge quantity. The target charge quantity may comprise a function of the charge quantities of the cells. Such balancing may comprise reducing the alignment distances such that they approach zero, or a brought to at least a predetermined distance of zero.

The target charge quantity may comprise an average of the charge quantities of the cells.

The target charge quantity may comprise an average of a preset number of the lowest charge quantities of the cells.

Balancing an unbalanced cell may comprise adjusting the current charge quantity of the unbalanced cell by an amount AhOutOfBalance=absolute value (target charge quantity−charge quantity of the cell). This may correspond to an embodiment where the alignment point is a target charge quantity. In this embodiment, the alignment distance is effectively AhOutOfBalance.

The method may further comprise determining, for each unbalanced cell, whether AhOutOfBalance is greater than a predetermined charge quantity threshold and, if so, carrying out the balancing of the unbalanced cell. Thus, there may only be a need to balance a cell if its alignment distance is sufficiently removed from the alignment distance setpoint. The predetermined charge quantity threshold may be 1 Ampere-hour.

The method may further comprise determining, for each unbalanced cell, whether AhOutOfBalance is greater than a predetermined fraction of the alignment distance setpoint and, if so, carrying out the balancing of the unbalanced cell. This may ensure that the unbalanced cell is balanced in the correct direction since, the further away a cell's alignment distance is from the alignment distance setpoint, the less certain we are of balancing the cell in the correct direction. The predetermined fraction may be 10%.

An alignment distance may determined according to: $(SOC\_i - SOC\_AlignmentPoint) * SOH\_i * NamePlateCapacity$, wherein $SOC\_i$ is a current state of charge of the cell, $SOC\_AlignmentPoint$ is the target state of charge, $SOH\_i$ is a state of health of the cell, and $NamePlateCapacity$ is a rated capacity of the cell.

The target state of charge may be from 20% to 80%, and more particular may be from 50% to 60%.

The target state of charge and/or the target charge quantity may be configurable by a user of the multi-cell battery.

An alignment distance may be determined according to: $(SOC\_i * SOH\_i * NamePlateCapacity) - AhConvergencePoint$, wherein $SOC\_i$ is a current state of charge of the cell, $AhConvergencePoint$ is the target charge quantity, $SOH\_i$ is a state of health of the cell, and $NamePlateCapacity$ is a rated capacity of the cell The method may further comprise determining, for each unbalanced cell, whether a current drawn from the unbalanced cell is within a predetermined current range and, if so, carrying out the balancing of the unbalanced cell. Thus, stored energy may be conserved and heat generation may be minimised.

The method may further comprise determining, for each unbalanced cell, whether a current state of charge of the unbalanced cell is greater than a state of charge threshold and, if so, carrying out the balancing of the unbalanced cell. Thus, the lifetime of the multi-cell battery may be improved, by avoiding balancing at the extremities of the cells' operating range.

Balancing an unbalanced cell may comprise dissipating charge contained in the unbalanced cell using a balancing circuit connected to the unbalanced cell.

Balancing an unbalanced cell may comprise charging the unbalanced cell using a balancing circuit connected to the unbalanced cell.

The method may further comprise, prior to determining the alignment distances, determining that voltages measured across each cell of the multi-cell battery have reached a steady state. The voltages may be open circuit voltages. The determining may comprise waiting a relaxation time before measuring the voltages across each cell. The relaxation time may be between 5 minutes and 30 minutes.

The alignment distances may be determined while the cells are in operation. During operation of the cells, errors in the determined alignment distances may be more acceptable than errors in open circuit voltages (as would be determined using traditional voltage setpoint balancing techniques). Thus, when the cells are in operation, it may be more accurate and appropriate to balance the cells according to a target state of charge or a target charge quantity, rather than a voltage setpoint (as in the prior art).

The alignment distances may be determined while a discharge current of the multi-cell battery is greater than 1 Ampere, or in another embodiment 5 Amperes.

The cells of the multi-cell battery may have a maximum charge capacity of between 20 Ampere-hours and 180 Ampere-hours.

The multi-cell battery may be configured to provide a maximum power output of between 100 kW and 800 kW.

The multi-cell battery may be configured to provide a discharge current of up to 10,000 Amperes.

In a further aspect of the disclosure, there is provided a system for balancing a multi-cell battery. The system comprises a balancing circuit connected in parallel to each cell of the multi-cell battery. The system further comprises one or more processors. The one or more processors are configured, for each cell, to determine an alignment distance defining a change in charge quantity required to achieve a target alignment point, based on a current charge quantity of the cell. The one or more processors are further configured to identify one or more unbalanced cells, based on the determined alignment distances. The one or more processors are further configured to balance each unbalanced cell by adjusting the current charge quantity of each unbalanced cell in accordance with the determined alignment distances.

The system may be configured to carry out any of the steps described in connection with the first aspect of the disclosure. The system may also comprise any of the features described in connection with the first aspect of the disclosure.

In a further aspect of the disclosure, the above-described methods may be implemented in a computer-readable medium. For example, the method may be implemented via software.

BRIEF DESCRIPTION OF THE DRAWINGS

Detailed embodiments of the disclosure will now be described in conjunction with the accompanying drawings of which.

DETAILED DESCRIPTION OF SPECIFIC EMBODIMENTS

The present disclosure seeks to provide improved methods of balancing a multi-cell battery. While various embodiments of the disclosure are described below, the disclosure is not limited to these embodiments, and variations of these embodiments may well fall within the scope of the disclosure which is to be limited only by the appended claims.

Figure 1:
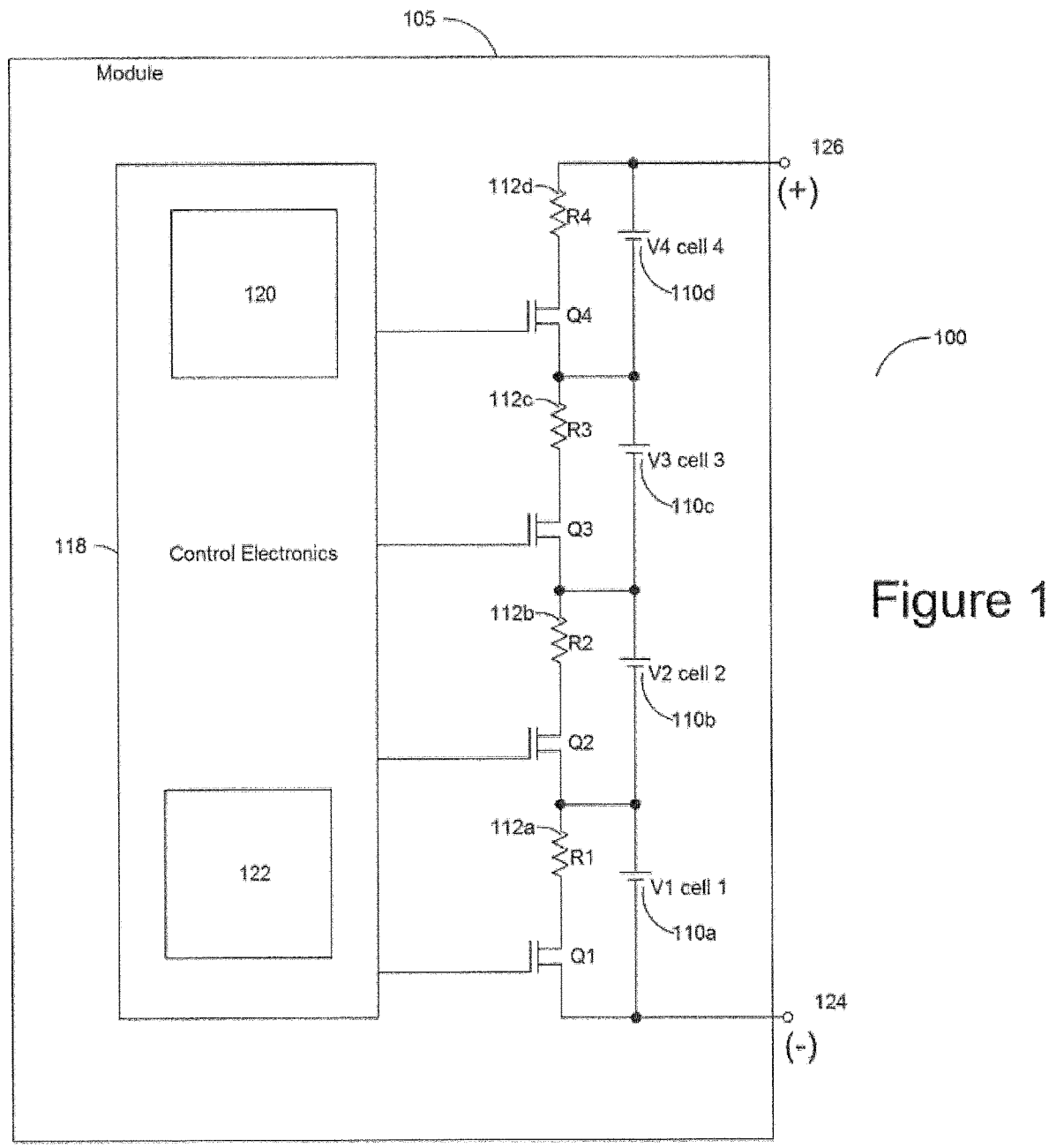
FIG. 1 is a circuit diagram of a system for balancing a multi-cell battery, in accordance with an embodiment of the disclosure.

Turning to FIG. 1, there is shown a circuit diagram of a system 100 for balancing a multi-cell battery, in accordance with an embodiment of the disclosure. System 100 comprises a battery module 105 having a plurality of serially connected lithium-ion cells 110$a$-$d$. Note that although in the present embodiment cells 110$a$-$d$ are represented as single cells, in other embodiments each of cells 110$a$-$d$ may be a series element comprising one or more cells in parallel. In addition, although the embodiment of FIG. 1 shows four cells in series arrangement, the disclosure embraces battery modules with any number of cells.

Each cell 110$a$-$d$ is connected in parallel to a corresponding balancing circuit 112$a$-$d$ comprising a corresponding transistor Q1-Q4 and a corresponding resistor R1-R4. Balancing circuits 112$a$-$d$ are configured to provide controlled balancing of cells 110$a$-$d$, as will be described in more detail below. Control electronics 118 (including a programmable component such as firmware) is connected to balancing circuits 112$a$-$d$ and comprises a number of components such as a processor 120, a memory 122, and other electronic components for controlling operation of transistors Q1-Q4 and measuring voltages V1-V4 across cells 110$a$-$d$ (for diagrammatic clarity, voltage pickups are not shown but are well known in the art).

To better understand the disclosure, the well-known procedure for cell balancing is as follows, using system 100 as a reference. First, it is generally necessary to stop current flow between the positive and negative terminals 124 and 126 and wait a settling time (also referred to as a relaxation time; typically 5 minutes or more) in order to accurately measure the cell voltages V1-V4 to determine if the cells are "in balance". If any cell voltages differ by a predetermined amount, then the control electronics determines that cell balancing is required. If balancing is required, the main battery current through positive and negative terminals 124 and 126 is kept very low, typically below 5% of the rated current of battery module 105. The transistor corresponding to the cell that has a higher-than-threshold voltage is activated, causing current to flow through the resistor corresponding to that cell. This current is referred to as the "balancing current". The resistor is chosen to have a high resistance so that the balancing current is small and the voltage reading remains accurate. The transistor is held active and the balancing current flows until the control electronics monitoring the voltage detects that the balancing is complete (i.e. the voltage across the cell has been balanced with the voltages across the other cells), at which time the transistor is deactivated. Battery module 105 may then be used again.

For example, if battery module 105 is left at rest for 10 minutes and V3 is measured by the control electronics to be 4110 mV, while the voltages at cells 1, 2 and 4 are all measured to be at 4100 mV, then transistor Q3 is activated. A balancing current will begin to flow through R3 and Q3 and will slowly deplete cell 3. This causes voltage V3 to slowly drop, until it is within a tolerance (about 5 mV) of voltages V1, V2 and V4, at which time V3 is 4105 mV and Q3 is deactivated. The balancing current stops and battery module 105 can be re-used.

In practice, for battery packs comprising multiple battery modules, each with multiple cells, the control electronics typically selects a "voltage setpoint" which is the lowest cell voltage in the entire collection of modules. Then, the transistors for all cells whose voltages exceed the voltage setpoint are simultaneously activated, and all modules are slowly drained of charge simultaneously. This type of balancing is referred to in the art as passive balancing. Active balancing, which is also contemplated within the scope of the disclosure, is carried out using a circuit configured to transfer charge from one cell to another, without 'bleeding out' the charge through a resistor. Circuits used for active balancing of cells are well-known to those of skill in the art, and are not described here.

There will now be described methods of balancing a multi-cell battery, in accordance with embodiments of the disclosure. The methods may be carried out by software, stored on a memory (such as memory 122) and executed by a processor (such as processor 120) using traditional balancing circuits (for example the ones described above in connection with FIG. 1). As opposed to using a voltage setpoint to balance the cells, the methods balance the cells about different alignment points. In one embodiment, described in connection with FIGS. 2, 3A-3D and 4A-4D, the alignment point is a predetermined state of charge. In a further embodiment, described in connection with FIGS. 5, 6A-6D and 4A-4D, the alignment point is a charge quantity.

Figure 2:
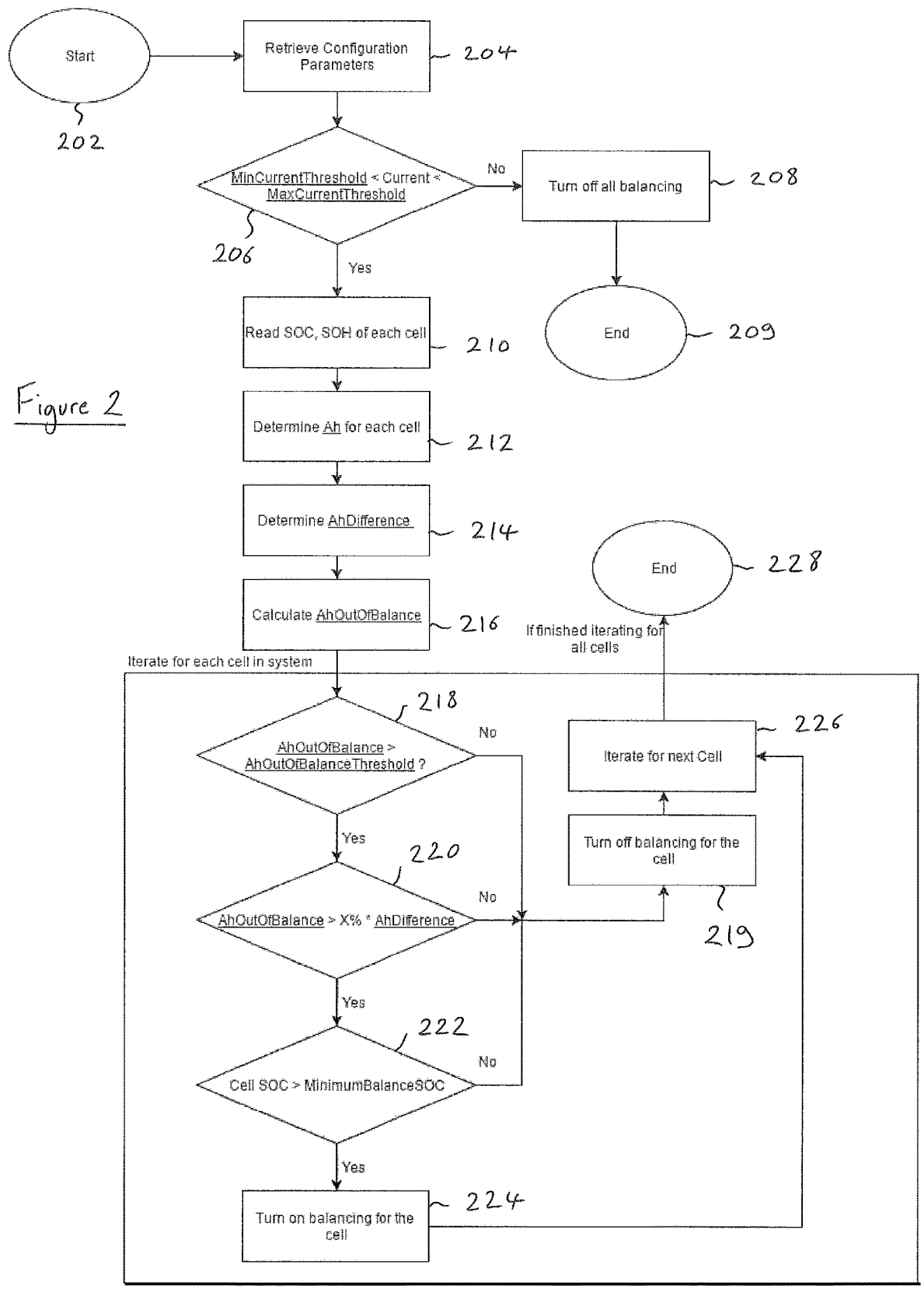
FIG. 2 is a flowchart showing the steps taken by a method of balancing a multi-cell battery, in accordance with an embodiment of the disclosure.
Figure 3:
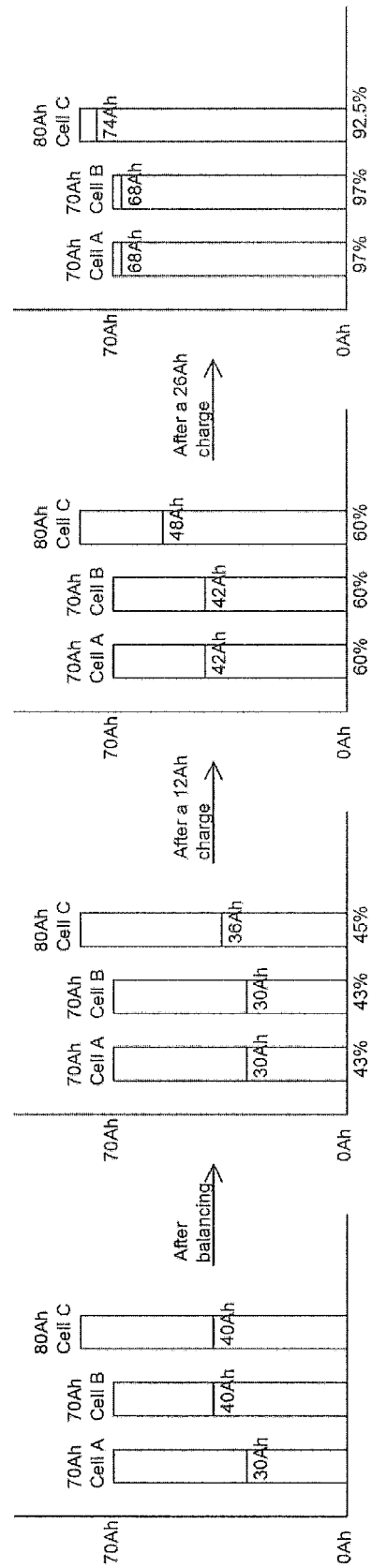
FIGS. 3A-3D are diagrammatic representations of states of charge of cells undergoing balancing in accordance with the method of FIG. 2.
Figure 4:
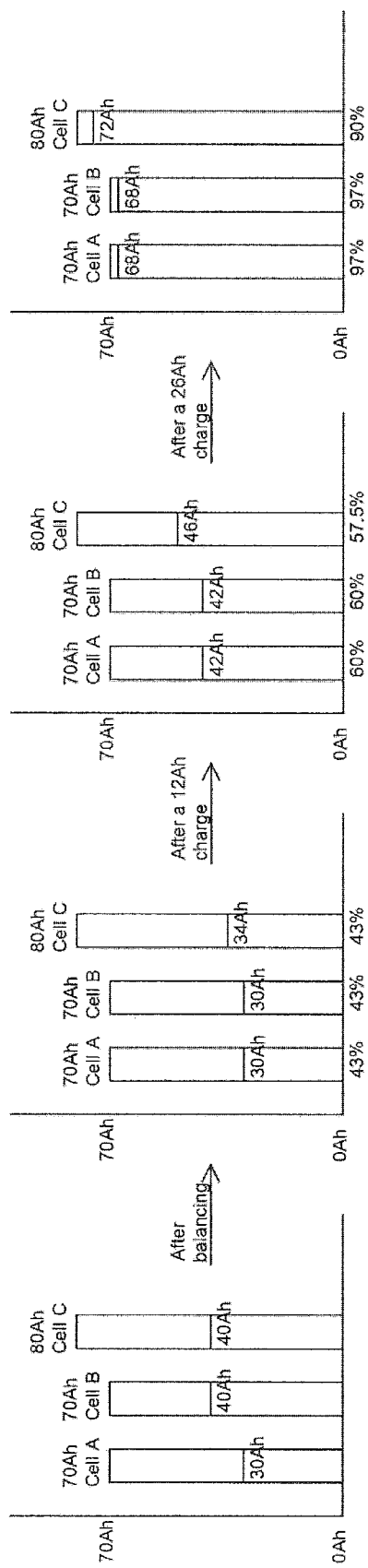
FIGS. 4A-4D are diagrammatic representations of states of charge of cells undergoing balancing according to a prior art method.

Turning to FIG. 2, there is now shown a method of balancing a multi-cell battery by balancing the cells about a preset, target state of charge. The method begins at step 202 of FIG. 2. At step 204, a number of configuration parameters are retrieved by the control electronics. For example, the configuration parameters may be retrieved from memory 122. The configuration parameters include any parameters necessary to determine whether any of the cells of the battery module require balancing. In the present embodiment, the configuration parameters include: SOC_AlignmentPoint; AhOutOfBalanceThreshold; MinCurrentThreshold; MaxCurrentThreshold; and N (the number of cells used in calculating AhDifference).

The process moves to step 206, where the control electronics determine whether a discharge current of the battery module is within a range of currents, defined by MinCurrentThreshold and MaxCurrentThreshold. MinCurrentThreshold may be −5 A (signifying a discharge current of 5 A) and the MaxCurrentThreshold may be C/2, where C is a C-rate of the battery module. In one embodiment, the MaxCurrentThreshold is 64 A. MinCurrentThreshold and MaxCurrentThreshold are configurable by the user. If a discharge current of the battery module is outside the range defined by MinCurrentThreshold and MaxCurrentThreshold, then the process moves to step 208 where any balancing of the cells which is underway is stopped. The process then moves to step 209 where the process ends and subsequently loops back to the start at step 202. The frequency of the looping may be set by the user and may be anywhere from 10 seconds to 5 minutes, for example. Other looping frequencies are contemplated.

If a discharge current of the battery module is between MinCurrentThreshold and MaxCurrentThreshold, then the process moves to step 210 where the control electronics determine for each cell a current state of charge (SOC) and a current state of health (SOH). Methods of determining SOC and SOH are known to those of skill in the art, and are not described in detail here. Generally, determining SOC comprises reading data from Coulomb counting and SEV measurements, among other readings. Generally, SOH can be determined by reading data from Coulomb counting, temperature and the SOC measurement, among other readings.

The method then moves to step 212 where, for each cell, the control electronics determine its alignment distance. In this embodiment, a cell's alignment distance defines or represents a change in charge quantity (whether an increase or decrease) required to achieve a predetermined target state of charge (SOC_AlignmentPoint). A cell's alignment distance is based on a current charge quantity in the cell (i.e. how much charge is remaining in the cell) and a charge capacity of the cell (i.e. the total amount of charge the cell can hold). The alignment distance may be defined in Ampere-hours, or some other unit of charge as known in the art. A cell's alignment distance therefore represents an amount of charge that is required to make the cell's current state of charge equal to the target state of charge. Note that the alignment distance may be either negative (in the case where the current state of charge of the cell is less than the target state of charge) or positive (in the case where the current state of charge of the cell is greater than the target state of charge).

The alignment distance is determined according to the following relationship:

$$(SOC\_i - SOC\_AlignmentPoint) * SOH\_i * NamePlateCapacity,$$

wherein SOC is the current state of the charge of the cell (determined in step 210), SOC_AlignmentPoint is the state of charge corresponding to the target state of charge, SOH_i is the current state of health of the cell (determined in step 210), and NamePlateCapacity is a rated capacity of the cell (i.e. the total amount of charge that can be contained in the cell). SOC_AlignmentPoint is configurable by the user, and is preferably selected so as to be roughly in the middle of the operating range of the cells. For example, if the cells are being operated in the range 20%-80% SOC, then SOC_AlignmentPoint is preferably selected so as to be about 50%. In the present embodiment, a default value of SOC_AlignmentPoint is 60%. Once an alignment distance has been calculated for each cell, the process moves to step 214.

At step 214, the control electronics determine AhDifference. If battery hardware supports both active balancing and passive balancing (i.e. both charging of unbalanced cells and draining of unbalanced cells), AhDifference may be defined as an average of all alignment distances determined at step 212. If only passive balancing is supported (i.e. the balancing circuits permit only draining of the cells), then AhDifference may be defined as an average of a number N of alignment distances within a small configurable range of the lowest alignment distance. When the battery module includes many cells, the number of cells whose alignment distances are used in determining AhDifference should be a small fraction of the total number of cells. For example, in one embodiment where the number of cells is 240, N may be 5, 6 or 7. Thus, 5, 6 or 7 of the cells with the lowest alignment distances would be used in determining AhDifference. In another example, if the battery module includes very few cells, and if only passive balancing is supported, then AhDifference may simply be defined as the lowest alignment distance.

The process then moves to step 216 where the control electronics determine AhOutOfBalance for each cell, according to the following relationship:

$$AhOutOfBalance = \text{absolute value}(AhDifference - \text{alignment distance})$$

Once AhOutOfBalance is determined for each cell, the process iterates through several steps (steps 218-224) that check whether a number of preset conditions are met before balancing a cell. Steps 218-224 are iterated for each cell in the battery module. In particular, at step 218, the control electronics determine whether AhOutOfBalance is greater than AhOutOfBalanceThreshold. AhOutOfBalanceThreshold is a preset configuration parameter and may be configured by the user. In one embodiment, AhOutOfBalanceThreshold is 1 Ampere-hour. If AhOutOfBalance is not greater than AhOutOfBalanceThreshold, then the process moves to step 219 where if the cell is undergoing balancing then the balancing is stopped. The process then moves to step 226 where the next cell in the series is checked to determine whether AhOutOfBalance is greater than AhOutOfBalanceThreshold (i.e. step 218).

If AhOutOfBalance is greater than AhOutOfBalanceThreshold, then the process moves to step 220 where the control electronics determine whether AhOutOfBalance is greater than a predetermined fraction of AhDifference. In one embodiment, the predetermined fraction is 10% of AhDifference. The predetermined fraction is a preset configuration parameter and may be configured by the user. If AhOutOfBalance is not greater than the predetermined fraction of AhDifference, then the process moves to step 219 where if the cell is undergoing balancing then the balancing is stopped. The process then moves to step 226 where the next cell in the series is checked to determine whether AhOutOfBalance is greater than AhOutOfBalanceThreshold (i.e. step 218).

If AhOutOfBalance is greater than the predetermined fraction of AhDifference, then the process moves to step 222 where the control electronics determine whether the SOC of the cell is greater than MinimumBalanceSOC. In one embodiment, MinimumBalanceSOC is 50%. MinimumBalanceSOC is a preset configuration parameter and may be configured by the user. If the SOC of the cell is not greater than MinimumBalanceSOC, then the process moves to step 219 where if the cell is undergoing balancing then the balancing is stopped. The process then moves to step 226 where the next cell in the series is checked to determine whether AhOutOfBalance is greater than AhOutOfBalanceThreshold (i.e. step 218).

If the SOC of the cell is greater than MinimumBalanceSOC, then the process moves to step 224 where the balancing of the cell is activated. Balancing of the cell comprises charging or draining (i.e. discharging) the cell, for example by using a discharging circuit as described in connection with FIG. 1, by an amount equal to AhOutOfBalance.

Without waiting for the balancing to finish, the process then moves to step 226 where the next cell in the series is checked to determine whether AhOutOfBalance is greater than AhOutOfBalanceThreshold (i.e. step 218). Steps 218-224 repeat for each cell until all cells meeting the requirements of steps 218-224 are balanced. Without waiting for the balancing to finish, the process moves to step 228 where the process ends. Once the process ends at step 222, the process is repeated on a loop, the frequency of which may be determined by the user. For example, the process may loop every 10 seconds, or every 5 minutes, depending on the various parameters of the battery module.

Following balancing of the cells, each cell's alignment distance will be roughly equal to AhDifference. In the case where only draining is supported, each cell's alignment distance will be roughly equal to the alignment distance of the lowest cell, or the average of the N lowest cells. In the case where both charging and draining of cells is supported, each cell's alignment distance will be roughly equal to the average of all the alignment distances. In other words, all cells will have been balanced relative to SOC_AlignmentPoint, meaning that all cells will have roughly equal alignment distances. Thus, the same change in charge quantity will bring all cells to the same predetermined alignment point, SOC_AlignmentPoint.

While a particular embodiment of a method of balancing cells in a multi-cell battery has been described, the scope of the disclosure is not limited to this method. In particular, the method may comprise more or fewer steps, and the order of the steps may be changed.

Turning to FIGS. 3A-4D, there are shown bar plots of the states of charge for various cells in an exemplary multi-cell battery. The multi-cell battery includes, for the purposes of these examples, three cells: Cell A, Cell B and Cell C. Cell A has a capacity of 70 Ah, Cell B has a capacity of 70 Ah, and Cell C has a capacity of 80 Ah. The target state of charge, SOC_AlignmentPoint, is set to 60%. Preferably, the cells of the multi-cell battery are operating within a range of states of charge that includes a 60% state of charge.

In FIG. 3A, control electronics (such as shown in FIG. 1) implements the method described in connection with FIG. 2, starting at step 202. At this point in time, Cell A has a charge quantity of 30 Ah, Cell B has a charge quantity of 40 Ah, and Cell C has a charge quantity of 40 Ah. For Cell A, 60% SOC equates to a charge quantity of 42 Ah; for Cell B, 60% SOC equates to a charge quantity of 42 Ah; and for Cell C, 60% SOC equates to a charge quantity of 48 Ah. Thus, the alignment distance of Cell A is −12 Ah, the alignment distance of Cell B is −2 Ah, and the alignment distance of Cell C is −8 Ah. AhDifference is therefore determined by the control electronics to be −12 Ah (the lowest of the alignment distances). Therefore, AhOutOfBalance for Cell A is 0, AhOutOfBalance for Cell B is 10 Ah, and AhOutOfBalance for Cell C is 4 Ah. Note that, for the purposes of this example, since the battery is shown as having only three cells, it is sufficient to set AhDifference as being equal to the lowest of the alignment distances. In addition, in this embodiment it is assumed that the balancing circuits of the battery support only draining of the cells.

Assuming that the preconditions in steps 218-222 are met, the control electronics therefore determine that Cells B and C are out of balance and require balancing by their respective AhOutOfBalance values. FIG. 3B shows the cells following balancing, wherein the charge quantity of Cell B has been reduced by 10 Ah to 30 Ah, and the charge quantity of Cell C has been reduced by 4 Ah to 36 Ah. At this point, all cells in the multi-cell battery are balanced with respect to the alignment point of 60% SOC. In other words, all of the Cells A-C are 12 Ah away from being at a state of charge of 60%.

During a charging phase of the multi-cell battery, following a 12 Ah charge of the Cells A-C, each cell is at an SOC of 60% (as can be seen in FIG. 3C). Following a further charge of 26 Ah, Cell A has a charge quantity of 68 Ah, Cell B has a charge quantity of 68 Ah, and Cell C has a charge quantity of 74 Ah. Each cell remains balanced relative to the alignment point of 60% SOC (i.e. each cell is 26 Ah away from the alignment point of 60% SOC).

This method of balancing may be contrasted with a more traditional balancing method which seeks to balance the cells relative to a voltage setpoint, as described above. FIG. 4A shows a similar setup with the same Cells A, B and C. As known in the prior art, each cell's open current voltage may be balanced such that the voltage across each cell is roughly equal.

Following balancing, as can be seen in FIG. 4B, Cells A, B and C are each at an SOC of about 43% (although it should be noted that, due to temperature differences between cells, voltage setpoint balancing often does not result in the cells being balanced to a common SOC). After a charge of 12 Ah (FIG. 4C), Cell C contains 46 Ah of remaining charge and is at an SOC of about 57.5%. In terms of the voltage setpoint, Cell C is already out of balance relative to Cells A and B (by about 2.5% SOC). Thus, if Cell C were to be re-balanced at the point in time of FIG. 4C, then the SOC of Cells A and B would drop to 57.5%.

Following a further charge of 26 Ah, as can be seen in FIG. 4D, the imbalance between Cells A and B, and Cell C, has grown. In particular, Cells A and B have 68 Ah of remaining charge (equating to a SOC of roughly 97%) while Cell C has 72 Ah of remaining charge, equating to an SOC of roughly 90%. In terms of the voltage setpoint, Cell C is now out of balance relative to Cells A and B by about 7% SOC. Thus, if Cell C were to be re-balanced at the point in time of FIG. 4D, then the SOC of Cells A and B would drop to 90%.

It is evident from FIGS. 4A-4D that, using the prior art method of voltage balancing, a cell will be deemed to be out of balance whenever its SOC differs from the SOC at which the cells are balanced as a whole (i.e. in this case 43%). This can often lead to additional, unnecessary balancing, which unnecessarily discharges the cells, wasting energy. An advantage of the method disclosed herein is that the cells may be found to be in balance even when the SOCs and voltages of the cells differ.

Figure 5:
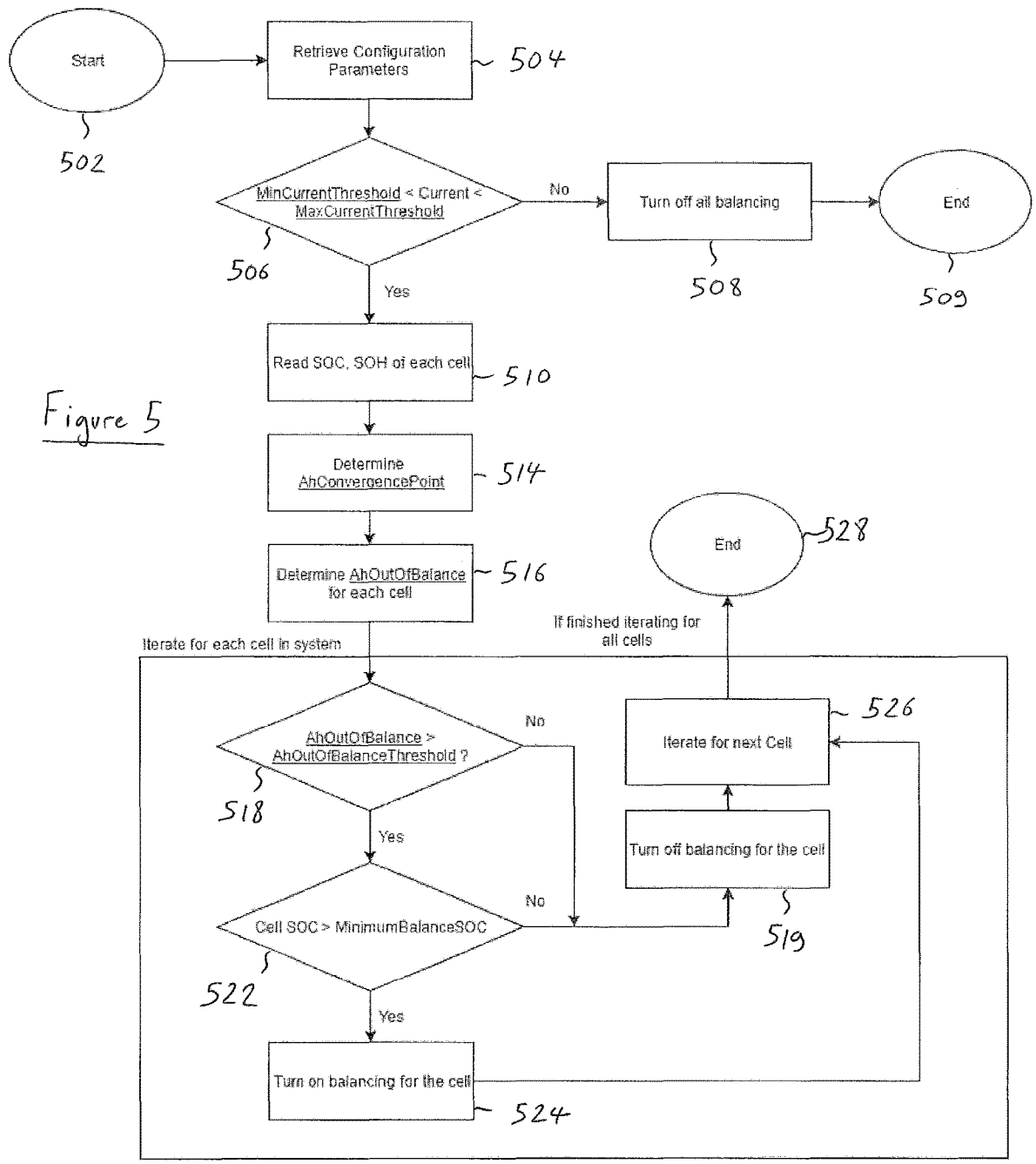
FIG. 5 is a flowchart showing the steps taken by a method of balancing a multi-cell battery, in accordance with an embodiment of the disclosure.

Turning to FIG. 5, there is shown an alternative method of balancing a multi-cell battery, in accordance with an embodiment of the disclosure. The method may be carried out by software, stored on a memory (such as memory 122) and executed by a processor (such as processor 120) using traditional balancing circuits (for example the ones described above in connection with FIG. 1). As opposed to balancing the cells about an alignment point which comprises a predetermined target state of charge, this method balances the cells about a target charge quantity. The method of FIG. 5 is largely the same as the method of FIG. 2, and like steps have been numbered with like reference numbers. The only appreciable differences are as follows.

In step 504, the configuration parameters that are retrieved by the control electronics include: AhOutOfBalanceThreshold; MinCurrentThreshold; MaxCurrentThreshold; and N (the number of cells used in calculating AhDifference).

In step 514, AhConvergencePoint is computed. AhConvergencePoint is the target charge quantity to which the cells will be balanced. AhConvergencePoint may be expressed in units of charge such as Ampere-hours or Coulombs, for example. If battery hardware supports both active balancing and passive balancing (i.e. both charging of unbalanced cells and draining of unbalanced cells), AhConvergencePoint may be defined as an average of the charge quantities of the cells. If only passive balancing is supported (i.e. the balancing circuits permit only draining of the cells), then AhConvergencePoint may be defined as an average of a number N of charge quantities within a small configurable range of the lowest charge quantity. When the battery module includes many cells, the number of cells whose charge quantities are used in determining AhConvergencePoint should be a small fraction of the total number of cells. For example, in one embodiment where the number of cells is 240, N may be 5, 6 or 7. Thus, 5, 6 or 7 of the cells with the lowest charge quantity would be used in determining AhConvergencePoint. In another example, if the battery module includes very few cells, and if only passive balancing is supported, then AhConvergencePoint may simply be defined as the lowest charge quantity. Note that, in contrast to the embodiment of FIG. 2, in this method AhConvergencePoint is not predetermined and may move as a function of the charge quantities of the cells. However, the disclosure does contemplate the possibility of AhConvergencePoint being preset by a user.

In step 516, the control electronics determine AhOutOfBalance for each cell, according to the following relationship:

$Ah$OutOfBalance_$i$=absolute value ($Ah$ConvergencePoint−charge_quantity_$i$), where charge_quantity_$i$ is equal to (SOC_$i$*SOH_$i$*NamePlateCapacity). SOC_$i$ is the current state of the charge of the cell, $Ah$ConvergencePoint is the target charge quantity, SOH_$i$ is the current state of health of the cell, and NamePlateCapacity is a rated capacity of the cell (i.e. the total amount of charge that can be contained in the cell).

It can be seen that, in the embodiment of FIG. 5, AhOutOfBalance_i is effectively the alignment distance of the cell.

Following balancing of the cells, each cell's remaining charge (i.e. charge quantity) will be roughly equal to AhConvergencePoint. In the case where only draining is supported, each cell's charge quantity will be roughly equal to the charge quantity of the lowest cell, or the average of the N lowest cells. In the case where both charging and draining of cells is supported, each cell's charge quantity will be roughly equal to the average of all the charge quantities. In other words, all cells will have been balanced relative to AhConvergencePoint, meaning that all cells will have roughly equal charge quantities. Note that in this embodiment the alignment distance of each cell is effectively reduced to zero, or to within a small configurable range of zero, as each cell's charge quantity approaches AhConvergencePoint.

While a particular embodiment of a method of balancing cells in a multi-cell battery has been described, the scope of the disclosure is not limited to this method. In particular, the method may comprise more or fewer steps, and the order of the steps may be changed. For example, in another embodiment, steps 502-528 may exactly mirror steps 202-228 of FIG. 2, except for the alignment distances being calculated according to:

(SOC_$i$*SOH_$i$*NamePlateCapacity)−$Ah$ConvergencePoint.

One may see that this is equivalent to an embodiment of FIG. 2 where SOC_AlignmentPoint is selected to be 0% SOC.

Turning to FIGS. 6A-6D, there are shown bar plots of the charge quantities of various cells in an exemplary multi-cell battery. This example is similar to that of FIGS. 3A-3D, with the multi-cell battery including three cells: Cell A, Cell B and Cell C. Cell A has a capacity of 70 Ah, Cell B has a capacity of 70 Ah, and Cell C has a capacity of 80 Ah. The target charge quantity, AhConvergencePoint, is set to 30 Ah. Preferably, the cells of the multi-cell battery are operating within a range of charge quantities that includes a charge quantity of 30 Ah.

Figures 6A, 6B, 6C, 6D:
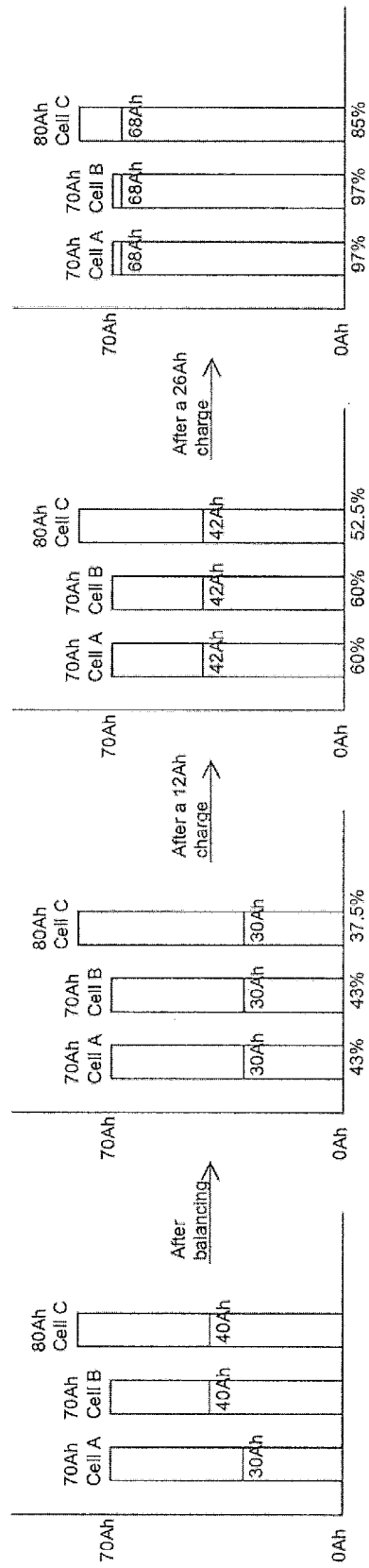
FIGS. 6A-6D are diagrammatic representations of charge quantities of cells undergoing balancing in accordance with the method of FIG. 5.

In FIG. 6A, control electronics (such as shown in FIG. 1) implement the method described in connection with FIG. 5, starting at step 502. At this point in time, Cell A has a charge quantity of 30 Ah, Cell B has a charge quantity of 40 Ah, and Cell C has a charge quantity of 40 Ah. AhConvergencePoint is 30 Ah (the lowest charge quantity). The alignment distance (AhOutOfBalance) of Cell A is 0 Ah, the alignment distance (AhOutOfBalance) of Cell B is −10 Ah, and the alignment distance (AhOutOfBalance) of Cell C is −10 Ah. Note that, for the purposes of this example, since the battery is shown as having only three cells, it is sufficient to set AhConvergencePoint as being equal to the lowest of the charge quantities. In addition, in this embodiment it is assumed that the balancing circuits of the battery support only draining of the cells.

Assuming that the preconditions in steps 518 and 522 are met, the control electronics therefore determine that Cells B and C are out of balance and require balancing by their respective AhOutOfBalance values. FIG. 6B shows the cells following balancing, wherein the charge quantity of Cell B has been reduced by 10 Ah to 30 Ah, and the charge quantity of Cell C has been reduced by 10 Ah to 30 Ah. At this point, all cells in the multi-cell battery are balanced with respect to the alignment point of 30 Ah. In other words, each of the Cells A-C has a charge quantity of 30 Ah. All alignment distances have been effectively reduced to zero.

During a charging phase of the multi-cell battery, following a 12 Ah charge of the Cells A-C, each cell has a charge quantity of 42 Ah (as can be seen in FIG. 6C). Following a further charge of 26 Ah, Cell A has a charge quantity of 68 Ah, Cell B has a charge quantity of 68 Ah, and Cell C has a charge quantity of 68 Ah. Each cell remains balanced relative to the alignment point of 30 Ah (i.e. each cell is 26 Ah away from the alignment point of 30 Ah).

Again, this method of balancing may be contrasted to the more traditional voltage balancing method of FIGS. 4A-4D. Using the prior art method of voltage-balancing, a cell will be deemed to be out of balance whenever its charge quantity differs from the charge quantity to which the cells are balanced as a whole. This can often lead to additional, unnecessary balancing, which unnecessarily discharges the cells, wasting energy. An advantage of the method disclosed herein is that the cells may be found to be in balance even when the charge quantities and voltages of the cells differ.

This description has been presented for purposes of illustration and description, but is not intended to be exhaustive or limited to the form disclosed. It will be apparent to persons skilled in the art that a number of variations and modifications can be made without departing from the scope of the claims. It is furthermore contemplated that any part of any aspect or embodiment discussed in this specification can be implemented or combined with any part of any other aspect or embodiment discussed in this specification.

The invention claimed is:

1. A method of balancing a multi-cell battery, comprising:
    for each cell, determining an alignment distance defining a change in charge quantity required to achieve a target alignment point, wherein the target alignment point comprises a predetermined target state of charge, based on a current charge quantity of the cell;
    identifying one or more unbalanced cells, based on the determined alignment distances; and
    balancing each unbalanced cell by adjusting the current charge quantity of each unbalanced cell in accordance with the determined alignment distances, wherein balancing each unbalanced cell comprises adjusting the current charge quantity of each unbalanced cell such that the alignment distances of the cells of the multi-cell battery are brought within a predetermined range of an alignment distance setpoint, the alignment distance setpoint comprising a function of one or more of the determined alignment distances.

2. The method of claim 1, wherein the target alignment point is between 20% and 80%.

3. The method of claim 1, wherein the target alignment point is comprised within an operating range of the multi-cell battery, the operating range comprising a range of charge quantities or states of charge within which, in use, each cell of the multi-cell battery is operated.

4. The method of claim 3, wherein the operating range is bounded by a maximum state of charge at which a first cell has a charge quantity equal to a charge quantity of a second cell at a state of charge of 100%.

5. The method of claim 4, wherein the first cell, when at a state of charge of 100%, has the greatest charge quantity from among the cells of the multi-cell battery, and wherein the second cell, when at a state of charge of 100%, has the least charge quantity from among the cells of the multi-cell battery.

6. The method of claim 1, wherein the alignment distance setpoint comprises an average of the determined alignment distances.

7. The method of claim 1, wherein the alignment distance setpoint comprises an average of a preset number of the lowest determined alignment distances.

8. The method of claim 1, wherein balancing an unbalanced cell comprises adjusting the current charge quantity of the unbalanced cell by an amount $$Ah\text{OutOfBalance} = \text{absolute value (alignment distance setpoint} - \text{alignment distance)}.$$

9. The method of claim 1, wherein balancing each unbalanced cell comprises adjusting the current charge quantity of each unbalanced cell such that the alignment distances of the cells of the multi-cell battery are brought within a predetermined range of the target charge quantity, the target charge quantity comprising a function of the charge quantities of the cells.

10. The method of claim 9, wherein the target charge quantity comprises an average of the charge quantities of the cells.

11. The method of claim 9, wherein the target charge quantity comprises an average of a preset number of the lowest charge quantities of the cells.

12. The method of claim 9, wherein balancing an unbalanced cell comprises adjusting the current charge quantity of the unbalanced cell by an amount $$Ah\text{OutOfBalance} = \text{absolute value (target charge quantity} - \text{charge quantity of the cell)}.$$

13. The method of claim 8, further comprising determining for each unbalanced cell whether AhOutOfBalance is greater than a predetermined charge quantity threshold and, if so, carrying out the balancing of the unbalanced cell.

14. The method of claim 8, further comprising determining for each unbalanced cell whether AhOutOfBalance is greater than a predetermined fraction of the alignment distance setpoint and, if so, carrying out the balancing of the unbalanced cell.

15. The method of claim 2, wherein an alignment distance is determined according to:

$$(SOC\_i - SOC\_AlignmentPoint) * SOH\_i * NamePlateCapacity,$$

wherein SOC_i is a current state of charge of the cell, SOC_AlignmentPoint is the target state of charge, SOH_i is a state of health of the cell, and NamePlateCapacity is a rated capacity of the cell.

16. The method of claim 1, wherein an alignment distance is determined according to:

$$(SOC\_i * SOH\_i * NamePlateCapacity) - AhConvergencePoint,$$

wherein SOC_i is a current state of charge of the cell, AhConvergencePoint is the target charge quantity, SOH_i is a state of health of the cell, and NamePlateCapacity is a rated capacity of the cell.

17. A non-transitory computer-readable medium, having computer-readable instructions stored thereon, the instructions configured when read by a computer to cause the method of claim 1 to be carried out.

18. A system for balancing a multi-cell battery, comprising:
 a balancing circuit connected in parallel to each cell of the multi-cell battery; and
 one or more processors configured to:
 for each cell, determine an alignment distance defining a change in charge quantity required to achieve a target alignment point, wherein the target alignment point comprises a predetermined target state of charge, based on a current charge quantity of the cell;
 identify one or more unbalanced cells, based on the determined alignment distances; and
 balance each unbalanced cell by adjusting the current charge quantity of each unbalanced cell in accordance with the determined alignment distances, wherein balancing each unbalanced cell comprises adjusting the current charge quantity of each unbalanced cell such that the alignment distances of the cells of the multi-cell battery are brought within a predetermined range of an alignment distance setpoint, the alignment distance setpoint comprising a function of one or more of the determined alignment distances.

* * * * *